US012565243B2

(12) United States Patent
Kim

(10) Patent No.: US 12,565,243 B2
(45) Date of Patent: Mar. 3, 2026

(54) APPARATUS AND METHOD FOR CONTROLLING A VEHICLE

(71) Applicants: HYUNDAI MOTOR COMPANY, Seoul (KR); KIA CORPORATION, Seoul (KR)

(72) Inventor: Dae Young Kim, Gwangmyeong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 135 days.

(21) Appl. No.: 18/756,879

(22) Filed: Jun. 27, 2024

(65) Prior Publication Data

US 2025/0196894 A1 Jun. 19, 2025

(30) Foreign Application Priority Data

Dec. 13, 2023 (KR) ........................ 10-2023-0181227

(51) Int. Cl.
*B60W 50/10* (2012.01)
*B60W 60/00* (2020.01)

(52) U.S. Cl.
CPC ........ *B60W 60/0053* (2020.02); *B60W 50/10* (2013.01); *B60W 60/0057* (2020.02); *B60W 60/0059* (2020.02); *B60W 2420/403* (2013.01); *B60W 2520/105* (2013.01); *B60W 2540/223* (2020.02); *B60W 2540/225* (2020.02)

(58) Field of Classification Search
CPC ............ B60W 50/10; B60W 60/0053; B60W 60/0057; B60W 60/0059; B60W 2420/403; B60W 2520/105; B60W 2540/223; B60W 2540/225
USPC .......................................................... 701/41
See application file for complete search history.

(56) References Cited

U.S. PATENT DOCUMENTS

| | | | | |
|---|---|---|---|---|
| 9,823,657 B1 * | 11/2017 | Palmer | .............. | B60W 60/0059 |
| 2016/0378114 A1 * | 12/2016 | Laur | .................... | G05D 1/0061 |
| | | | | 701/23 |
| 2017/0368936 A1 * | 12/2017 | Kojima | .................. | B60K 28/06 |
| 2019/0129417 A1 * | 5/2019 | Noto | ................. | B60W 60/0053 |
| 2019/0299996 A1 * | 10/2019 | Stübing | ................ | B60W 30/16 |
| 2024/0059269 A1 * | 2/2024 | Kuroda | ................ | G06V 20/597 |
| 2024/0270254 A1 * | 8/2024 | Hayakawa | ....... | G08G 1/096716 |

* cited by examiner

*Primary Examiner* — Erick R Solis
(74) *Attorney, Agent, or Firm* — Lempia Summerfield Katz LLC

(57) ABSTRACT

A vehicle control device includes a steering wheel that specifies a driving direction of a host vehicle and a processor. The processor may: determine that the host vehicle is under autonomous driving control; determine a candidate value for a threshold value or a candidate value for a threshold time based on at least one of a maximum deceleration value among decelerations of the host vehicle measured during a specified time, a strength with which the steering wheel is gripped, or any combination thereof; determine a threshold value or a threshold time value; switch control of driving of the host vehicle from a system to the driver based on steering wheel being operated with an amount of operation greater than the threshold value and for a time greater than the threshold time value; and control the host vehicle based on an operation of the driver.

20 Claims, 9 Drawing Sheets

VEHICLE CONTROL DEVICE
101

STEERING WHEEL
103

PROCESSOR
105

FIG.1

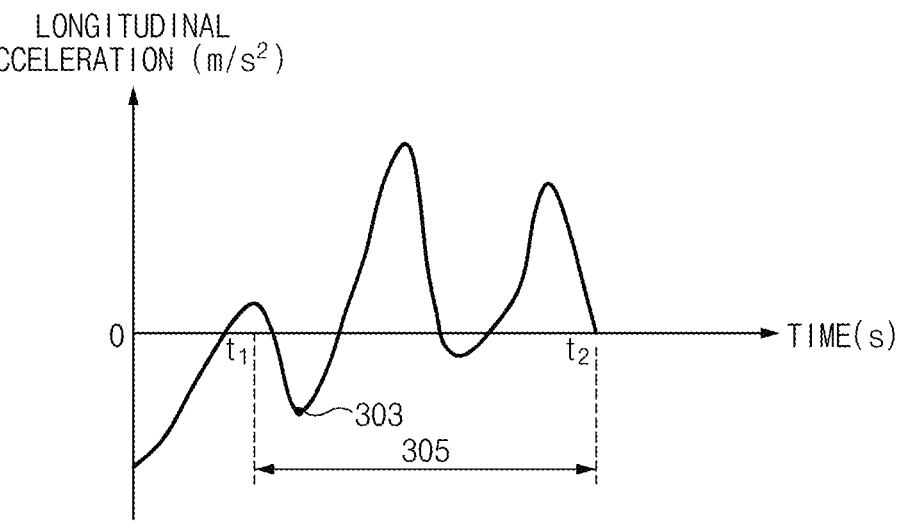
301
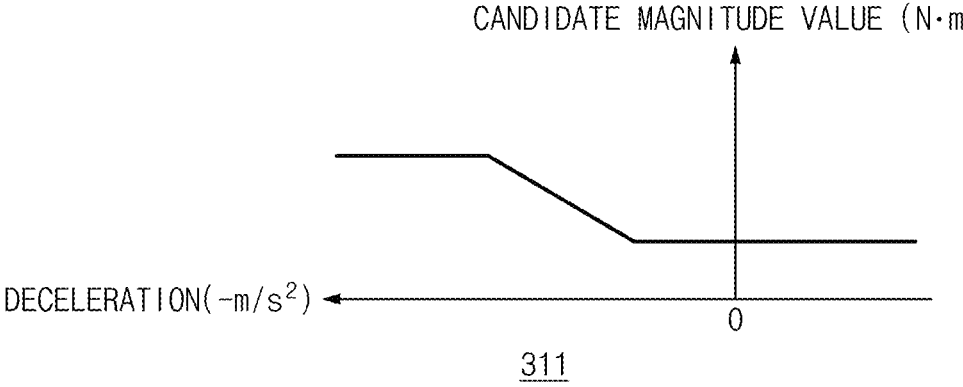
311
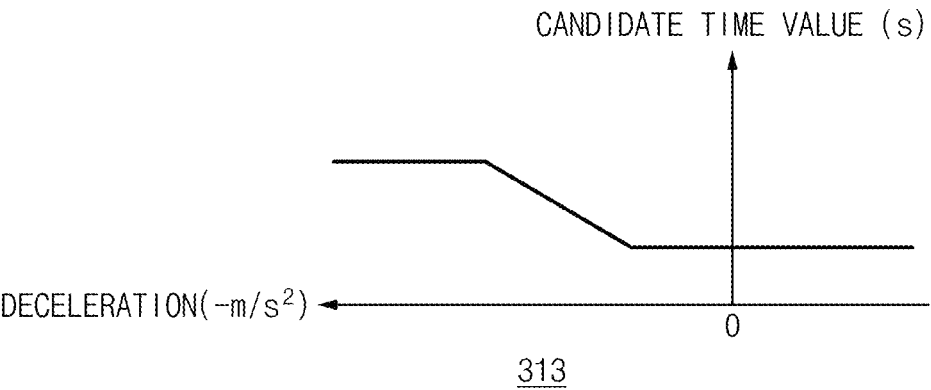
313
FIG.3

| STEERING WHEEL GRIP | FIRST GRIP | SECOND GRIP | NON-GRIP |
|---|---|---|---|
| OPERATION WEIGHT | W1 | W2 | W3 |
| TIME WEIGHT | W4 | W5 | W6 |

STRENGTH OF FIRST GRIP > STRENGTH OF SECOND GRIP $0 < W1 < W2 < W3 \leqq 1$ $0 < W1 < W2 < W3 \leqq 1$ <u>401</u>

FIG.4

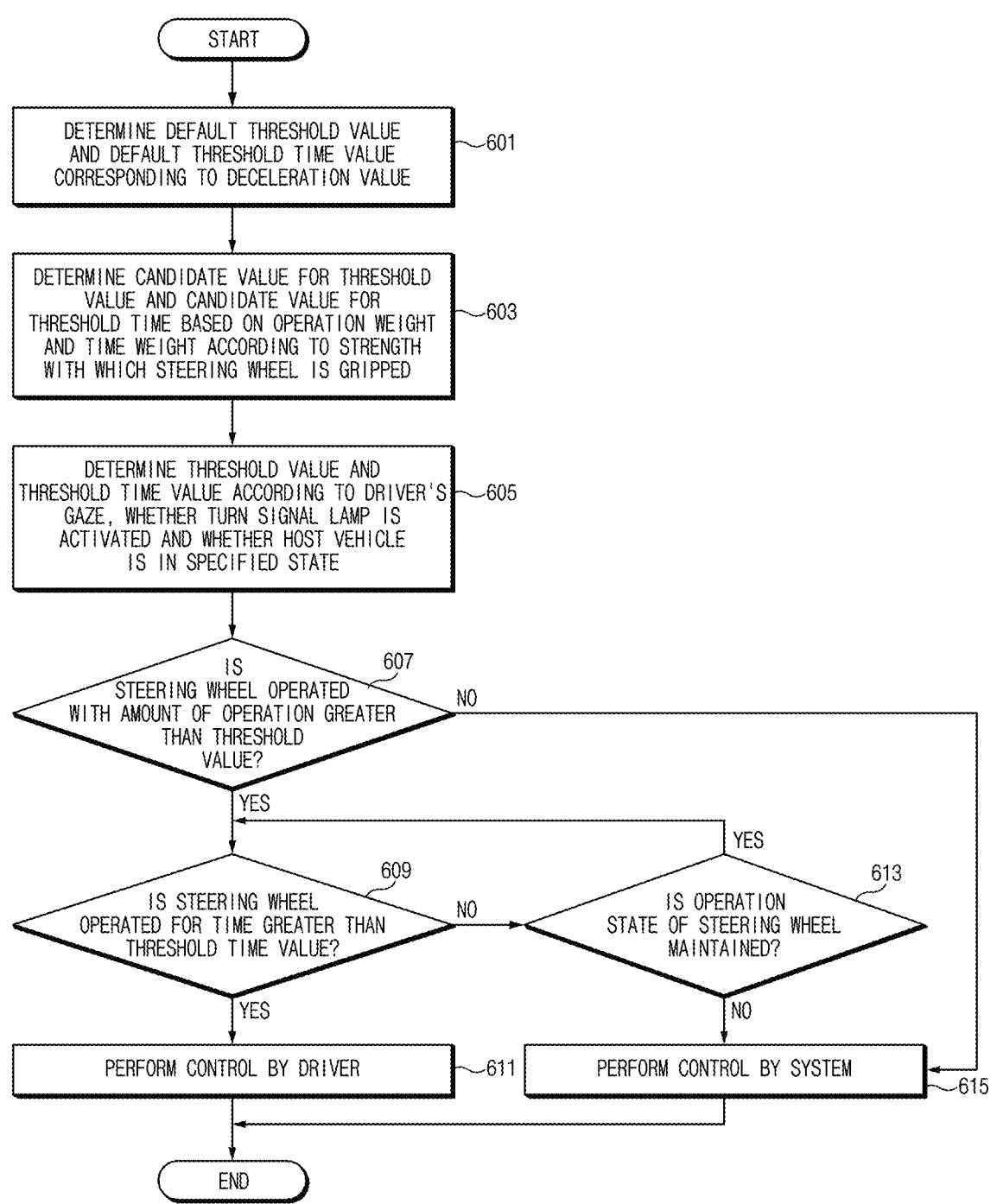

START

DETERMINE DEFAULT THRESHOLD VALUE
AND DEFAULT THRESHOLD TIME VALUE
CORRESPONDING TO DECELERATION VALUE ⟶601

DETERMINE CANDIDATE VALUE FOR THRESHOLD
VALUE AND CANDIDATE VALUE FOR
THRESHOLD TIME BASED ON OPERATION WEIGHT
AND TIME WEIGHT ACCORDING TO STRENGTH
WITH WHICH STEERING WHEEL IS GRIPPED ⟶603

DETERMINE THRESHOLD VALUE AND
THRESHOLD TIME VALUE ACCORDING TO DRIVER'S
GAZE, WHETHER TURN SIGNAL LAMP IS
ACTIVATED AND WHETHER HOST VEHICLE
IS IN SPECIFIED STATE ⟶605

IS
STEERING WHEEL OPERATED
WITH AMOUNT OF OPERATION GREATER
THAN THRESHOLD
VALUE? 607

NO

YES

IS STEERING WHEEL
OPERATED FOR TIME GREATER THAN
THRESHOLD TIME VALUE? 609

NO

YES

IS OPERATION
STATE OF STEERING WHEEL
MAINTAINED? 613

YES

NO

PERFORM CONTROL BY DRIVER ⟶611

PERFORM CONTROL BY SYSTEM ⟶615

END

FIG.6

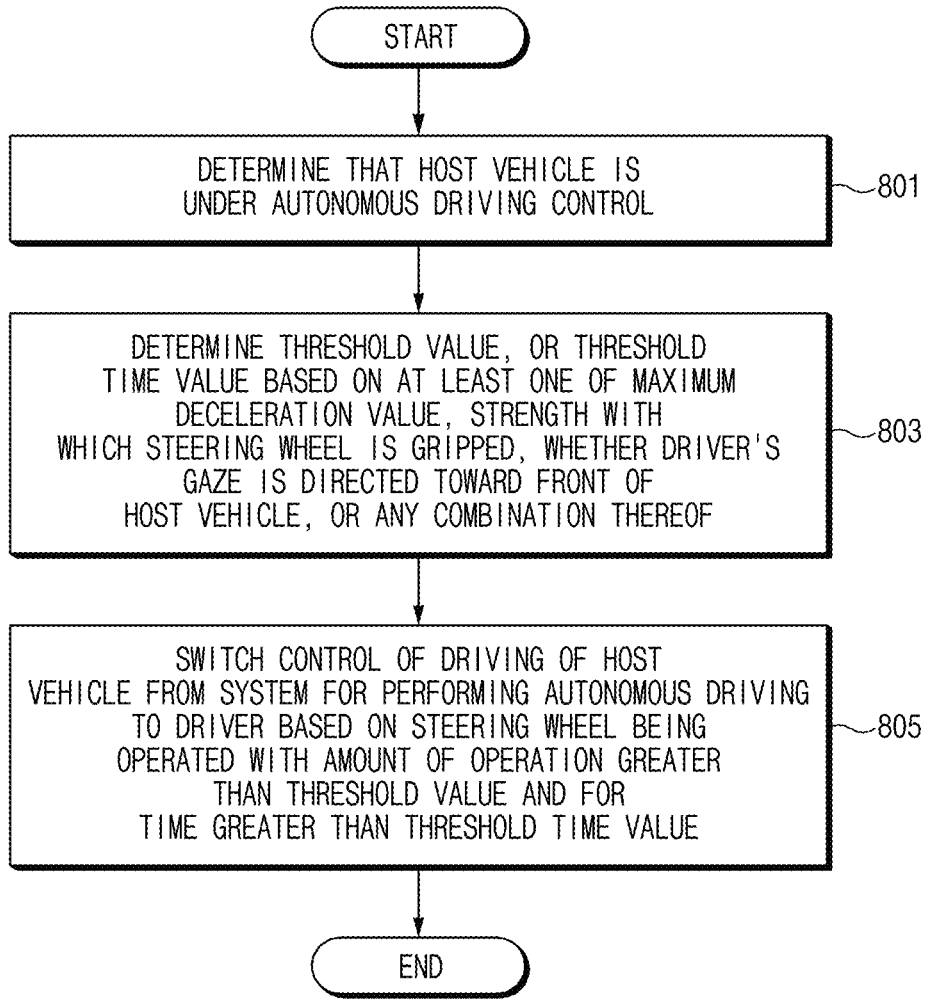

START

DETERMINE THAT HOST VEHICLE IS
UNDER AUTONOMOUS DRIVING CONTROL        ~801

DETERMINE THRESHOLD VALUE, OR THRESHOLD
TIME VALUE BASED ON AT LEAST ONE OF MAXIMUM
DECELERATION VALUE, STRENGTH WITH
WHICH STEERING WHEEL IS GRIPPED, WHETHER DRIVER'S
GAZE IS DIRECTED TOWARD FRONT OF
HOST VEHICLE, OR ANY COMBINATION THEREOF        ~803

SWITCH CONTROL OF DRIVING OF HOST
VEHICLE FROM SYSTEM FOR PERFORMING AUTONOMOUS DRIVING
TO DRIVER BASED ON STEERING WHEEL BEING
OPERATED WITH AMOUNT OF OPERATION GREATER
THAN THRESHOLD VALUE AND FOR
TIME GREATER THAN THRESHOLD TIME VALUE        ~805

END

APPARATUS AND METHOD FOR CONTROLLING A VEHICLE

CROSS-REFERENCE TO RELATED APPLICATION

This application claims the benefit of and priority to Patent Application No. 10-2023-0181227, filed in the Korean Korean Intellectual Property Office on Dec. 13, 2023, the entire contents of which are incorporated herein by reference.

TECHNICAL FIELD

The present disclosure relates to a vehicle control device and a vehicle control method and more particularly, to a technology for controlling a vehicle according to a driver's input in a vehicle under autonomous driving control.

BACKGROUND

Driving technology based on autonomous driving technology refers to technology of detecting a surrounding environment, avoiding obstacles, and adjusting a driving route to a destination with minimal driver intervention.

As autonomous driving technology becomes more sophisticated, the scope and frequency of driver intervention required for driving is decreasing. However, in a specific situation, there is a need to control the vehicle through intervention of a human driver even when autonomous driving is being performed.

In various situations that occur while driving, research is being conducted on the decisions to give priority between the driver's judgment and the autonomous driving system's judgment by comparing and evaluating the improvement of driving safety and driver convenience. The subject matter described in this background section is intended to promote an understanding of the background of the disclosure and thus may include subject matter that is not already known to those of ordinary skill in the art.

SUMMARY

The present disclosure has been made to solve the above-mentioned problems occurring in the prior art while advantages achieved by the prior art are maintained intact.

Aspects of the present disclosure provide a vehicle control device and a vehicle control method that determine whether the operation of the steering wheel is caused by a driver's intention based on the driver's gaze under autonomous driving control.

Aspects of the present disclosure provide a vehicle control device and a vehicle control method that determine whether the operation of the steering wheel is caused by a driver's intention based on the driver's gaze and whether a turn signal lamp is operating under autonomous driving control.

Aspects of the present disclosure provide a vehicle control device and a vehicle control method that allow a driver to take over control of driving when there is a specified state in which it is necessary to change control of driving of a host vehicle under autonomous driving control from a system for performing autonomous driving to a driver.

Aspects of the present disclosure provide a vehicle control device and a vehicle control method that reduce an accident risk due to operation of a steering wheel under autonomous driving control.

The technical problems to be solved by the present disclosure are not limited to the aforementioned problems. Any other technical problems not mentioned herein should be more clearly understood from the following description by those having ordinary skill in the art to which the present disclosure pertains.

According to an aspect of the present disclosure, a vehicle control device includes a steering wheel that specifies a driving direction of a host vehicle and a processor. The processor may determine that the host vehicle is under autonomous driving control. The processor may determine a candidate value for a threshold value or a candidate value for a threshold time value based on at least one of a maximum deceleration value among decelerations of the host vehicle measured during a specified time, a strength with which the steering wheel is gripped, or any combination thereof. The processor may determine a threshold value or a threshold time value based on the candidate value for the threshold value, the candidate value for the threshold time, whether a driver's gaze is directed toward front of the host vehicle, or any combination thereof. The processor may switch control of driving of the host vehicle from a system for performing autonomous driving to the driver based on the steering wheel being operated with an amount of operation greater than the threshold value and for a time greater than the threshold time value. The processor may control the host vehicle based on the driver's operation.

According to an embodiment, the processor may determine the candidate value for the threshold value as the threshold value and determine the candidate value for the threshold time as the threshold time value when the driver's gaze is directed toward the front of the host vehicle. The processor may determine, as the threshold value, a greater value of the candidate value for the threshold value and a first specified value, which is a specified value and determine, as the threshold time value, a greater value of the candidate value for the threshold time and a first specified time value, which is a specified time value, when the driver's gaze is not directed toward the front of the host vehicle.

According to an embodiment, the processor may determine, as the threshold value, a value determined based on at least one of a specific deceleration value of the host vehicle at a specific point in time, the strength with which the steering wheel is gripped, or any combination thereof when the driver's gaze is directed toward the front of the host vehicle. The processor may determine, as the threshold time value, a time value determined based on at least one of the specific deceleration value, the strength with which the steering wheel is gripped, or any combination thereof when the driver's gaze is directed toward the front of the host vehicle. The processor may determine, as the threshold value, a greater value of the value and a second specified value, which is a specified value when the driver's gaze is not directed toward the front of the host vehicle. The processor may determine, as the threshold time value, a greater value of the time value and a second specified time value, which is a specified time value, when the driver's gaze is not directed toward the front of the host vehicle.

According to an embodiment, the processor may determine the candidate value for the threshold value as the threshold value and the candidate value for the threshold time as the threshold time value when a right turn signal lamp is activated and the driver's gaze is directed toward a right side of the host vehicle, or when a left turn signal lamp is activated and the driver's gaze is directed toward a left side of the host vehicle even though the driver's gaze is not directed toward the front of the host vehicle.

3                                             4

According to an embodiment, the processor may determine, based on determining that the host vehicle is in a specified state, the threshold value in correspondence with a value obtained by multiplying, by a specified state weight, a value determined based on the candidate value for the threshold value and whether the driver's gaze is directed toward the front of the host vehicle. The processor may determine, based on a determination that the host vehicle is in the specified state, the threshold time value in correspondence with a value obtained by multiplying, by a state weight identical to or different from the specified state weight, the value determined based on the candidate value for the threshold time and whether the driver's gaze is directed toward the front of the host vehicle. The specified state may include a state in which there is a need to switch control of driving of the host vehicle from the system for performing the autonomous driving to the driver.

According to an embodiment, the vehicle control device may further include a camera configured to acquire an image including the driver. The processor may determine a point to which the driver's gaze is directed on a windshield of the host vehicle through the camera. The processor may determine whether the driver's gaze is directed toward the front of the host vehicle based on a determination that the point is included within a specified area on the windshield.

According to an embodiment, the processor may determine a default threshold value based on the maximum deceleration value. The processor may assign an operation weight based on the strength with which the steering wheel is gripped. The processor may determine the candidate value for the threshold value based on a value obtained by multiplying the default threshold value by the operation weight.

According to an embodiment, the processor may determine a default threshold time value based on the maximum deceleration value. The processor may assign a time weight based on the strength with which the steering wheel is gripped. The processor may determine the candidate value for the threshold time based on a value obtained by multiplying the default threshold time value by the time weight.

According to an embodiment, the processor may determine whether the driver's gaze is directed to a right side of the host vehicle based on a determination that the driver's gaze is directed toward an area including a right side mirror through the camera. The processor may determine whether the driver's gaze is directed toward a left side of the host vehicle based on a determination that the driver's gaze is directed toward an area including a left side mirror through the camera.

The processor may determine a default threshold value based on the maximum deceleration value. The processor may assign an operation weight based on the strength with which the steering wheel is gripped. The processor may determine the candidate value for the threshold value based on a value obtained by multiplying the default threshold value by the operation weight.

According to an aspect of the present disclosure, a vehicle control method includes determining that a host vehicle is under autonomous driving control. The vehicle control method includes determining a candidate value for a threshold value or a candidate value for a threshold time based on at least one of a maximum deceleration value among decelerations of the host vehicle measured during a specified time, a strength with which a steering wheel is gripped, or any combination thereof. The vehicle control method includes determining a threshold value or a threshold time value based on the candidate value for the threshold value, the candidate value for the threshold time, whether a driver's gaze is directed toward front of the host vehicle, or any combination thereof. The vehicle control method includes switching control of driving of the host vehicle from a system for performing autonomous driving to the driver based on the steering wheel being operated with an amount of operation greater than the threshold value and for a time greater than the threshold time value. The vehicle control method includes controlling the host vehicle based on the driver's operation.

According to an embodiment, determining the threshold value or the threshold time value may include determining the candidate value for the threshold value as the threshold value when the driver's gaze is directed toward the front of the host vehicle. Determining the threshold value or the threshold time value may include determining, as the threshold value, a greater value of the candidate value for the threshold value and a first specified value, which is a specified value, when the driver's gaze is not directed toward the front of the host vehicle. Determining the threshold value or the threshold time value may include determining the candidate value for the threshold time as the threshold time value when the driver's gaze is directed toward the front of the host vehicle. Determining the threshold value or the threshold time value may include determining, as the threshold time value, a greater value of the candidate value for the threshold time and a first specified time value, which is a specified time value, when the driver's gaze is not directed toward the front of the host vehicle.

According to an embodiment, determining the threshold value or the threshold time value may include determining, as the threshold value, a value determined based on at least one of a specific deceleration value of the host vehicle at a specific point in time, the strength with which the steering wheel is gripped, or any combination thereof when the driver's gaze is directed toward the front of the host vehicle. Determining the threshold value or the threshold time value may include determining, as the threshold value, a greater value of the value and a second specified value, which is a specified value, when the driver's gaze is not directed toward the front of the host vehicle. Determining the threshold value or the threshold time value may include determining, as the threshold time value, a time value determined based on at least one of the specific deceleration value, the strength with which the steering wheel is gripped, or any combination thereof when the driver's gaze is directed toward the front of the host vehicle. Determining the threshold value or the threshold time value may include determining, as the threshold time value, a greater value of the time value and a second specified time value, which is a specified time value, when the driver's gaze is not directed toward the front of the host vehicle.

According to an embodiment, determining the threshold value or the threshold time value may include determining the candidate value for the threshold value as the threshold value, even though the driver's gaze is not directed toward the front of the host vehicle when the driver's gaze is directed toward a right side of the host vehicle and a right turn signal lamp is activated, or when the driver's gaze is directed toward a left side of the host vehicle and a left turn signal lamp is activated. Determining the threshold value or the threshold time value may include determining the candidate value for the threshold time as the threshold time value, even though the driver's gaze is not directed toward the front of the host vehicle, when the driver's gaze is directed toward the right side of the host vehicle and the right turn signal lamp is activated or when the driver's gaze is directed toward the left side of the host vehicle and the left turn signal lamp is activated.

According to an embodiment, the vehicle control method may further include determining, based on determining that the host vehicle is in a specified state, the threshold value in correspondence with a value obtained by multiplying, by a specified state weight, a value determined based on the candidate value for the threshold value and whether the driver's gaze is directed toward the front of the host vehicle. The vehicle control method may further include determining, based on whether the driver's gaze is directed toward the front of the host vehicle, the threshold time value in correspondence with a value obtained by multiplying, by a state weight identical to or different from the specified state weight, the value determined based on the candidate value for the threshold time and whether the driver's gaze is directed toward the front of the host vehicle. The specified state may include a state in which there is a need to switch control of driving of the host vehicle from the system for performing the autonomous driving to the driver.

According to an embodiment, the vehicle control method may further include determining a point to which the driver's gaze is directed on a windshield of the host vehicle through a camera for acquiring an image including the driver. The vehicle control method may include determining whether the driver's gaze is directed toward the front of the host vehicle based on determining that the point is included within a specified area on the windshield.

According to an embodiment, determining the candidate value for the threshold value or the candidate value for the threshold time may include determining a default threshold value based on the maximum deceleration value; assigning an operation weight based on the strength with which the steering wheel is gripped; and determining the candidate value for the threshold value based on a value obtained by multiplying the default threshold value by the operation weight.

According to an embodiment, determining the candidate value for the threshold value or the candidate value for the threshold time may include determining a default threshold time value based on the maximum deceleration value; assigning a time weight based on the strength with which the steering wheel is gripped; and determining the candidate value for the threshold time based on a value obtained by multiplying the default threshold time value by the time weight.

According to an embodiment, the vehicle control method may further include determining whether the driver's gaze is directed to a right side of the host vehicle based on a determination that the driver's gaze is directed toward an area including a right side mirror through the camera. The vehicle control method may further include determining whether the driver's gaze is directed toward a left side of the host vehicle based on a determination that the driver's gaze is directed toward an area including a left side mirror through the camera.

According to an embodiment, determining the candidate value for the threshold value or the candidate value for the threshold time may include determining a default threshold value based on the maximum deceleration value; assigning an operation weight based on the strength with which the steering wheel is gripped; and determining the candidate value for the threshold value based on a value obtained by multiplying the default threshold value by the operation weight.

BRIEF DESCRIPTION OF THE DRAWINGS

The above and other objects, features, and advantages of the present disclosure should be more apparent from the following detailed description taken in conjunction with the accompanying drawings:

FIG. 1 is a block diagram showing the configuration of a vehicle control device according to an embodiment of the present disclosure;

FIG. 3 shows an example of a graph showing the relationship between decelerations and thresholds in a vehicle control device or vehicle control method according to an embodiment of the present disclosure;

FIG. 4 shows an example of a table showing the relationship between the gripping state of a steering wheel and weights in a vehicle control device or vehicle control method according to an embodiment of the present disclosure;

FIG. 6 shows a flowchart of operation of a vehicle control device for switching control of driving from a system for performing autonomous driving to a driver based on a threshold value according to an operation weight and a threshold time value according to a time weight in a vehicle control device or a vehicle control method according to an embodiment of the present disclosure;

FIG. 8 shows a flowchart of operation of a vehicle control device for switching control of driving from a system for performing autonomous driving to a driver based on a threshold value and a threshold time value according to a driver's gaze in a vehicle control device or a vehicle control method according to an embodiment of the present disclosure.

DETAILED DESCRIPTION

Figure 2:
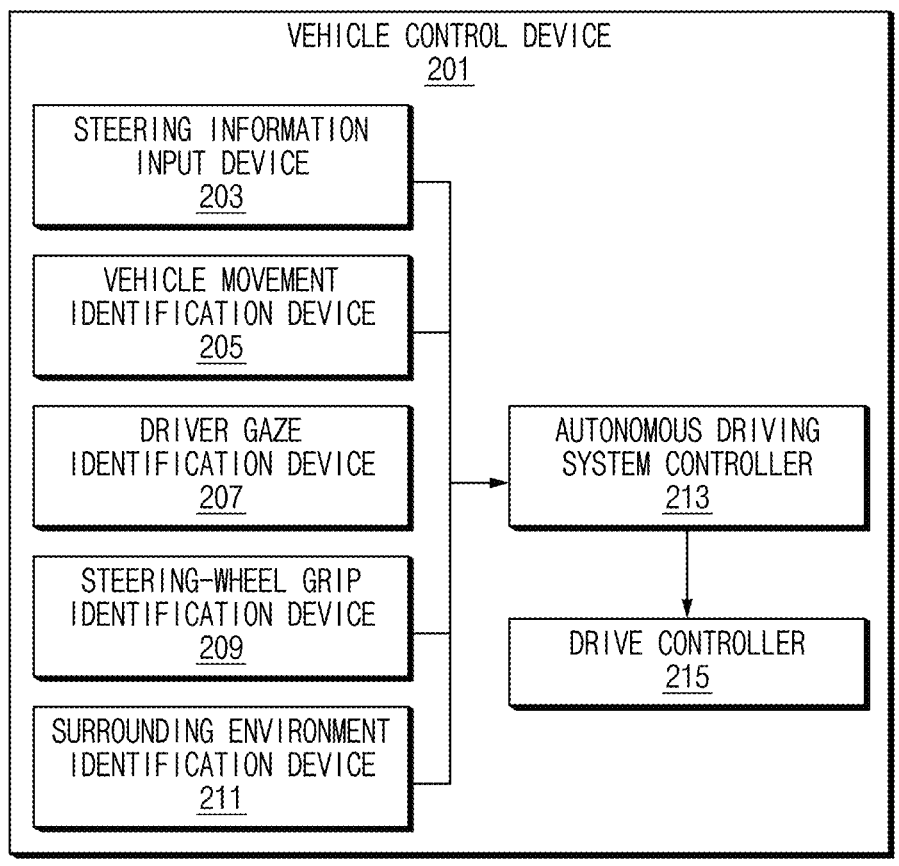
FIG. 2 is a block diagram specifically illustrating a configuration of a vehicle control device according to an embodiment of the present disclosure.

Hereinafter, some embodiments of the present disclosure are described in detail with reference to the drawings. In adding the reference numerals to the components of each drawing, it should be noted that the identical or equivalent components are designated by the identical numeral even when the components are displayed on other drawings. Further, in describing the embodiments of the present disclosure, a detailed description of well-known features or functions has been omitted in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those having ordinary skill in the art to which the present disclosure pertains. Such terms as those defined in a generally used dictionary should be interpreted as having meanings consistent with the contextual meanings in the relevant field of art should not be interpreted as having ideal or excessively formal meanings unless clearly defined as having such in the present disclosure. When a controller, module, component, device, element, or the like of the present disclosure is described as having a purpose or performing an operation, function, or the like, the controller, module, component, device, element, or the like should be considered herein as being "configured to" meet that purpose or to perform that operation or function. Each controller, module, component, device, element, and the like may separately embody or be included with a processor and a memory, such as a non-transitory computer readable media, as part of the apparatus.

Figure 1:
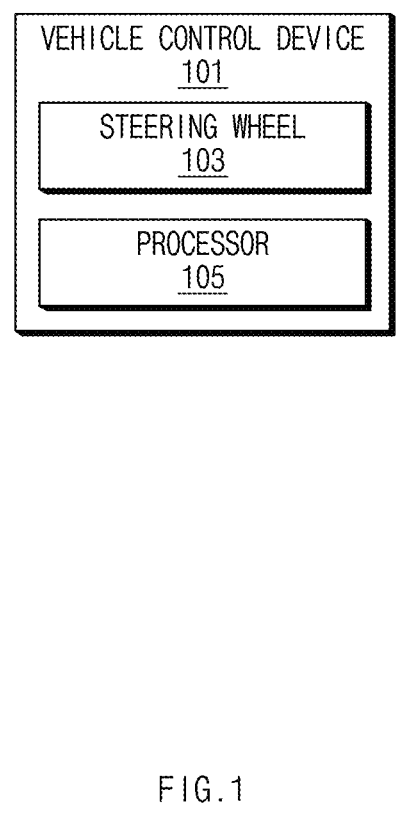

Hereinafter, embodiments of the present disclosure are described in detail with reference to FIGS. 1-9.

FIG. 1 is a block diagram showing the configuration of a vehicle control device according to an embodiment of the present disclosure.

A vehicle control device 101 according to an embodiment of the present disclosure may be implemented inside or outside a vehicle. Some of components included in the vehicle control device 101 may be implemented inside or outside the vehicle.

Referring to FIG. 1, the vehicle control device 101 may include at least one of a steering wheel 103, a processor 105, or any combination thereof. At least one of the steering wheel 103, the processor 105, or any combination thereof may be electronically and/or operably coupled with each other by an electronic component, such as a communication bus.

According to an embodiment, hereinafter, combining pieces of hardware operatively may mean a direct connection or an indirect connection between the pieces of hardware being established in a wired or wireless manner such that first hardware of the pieces of hardware can be controlled by second hardware of the pieces of hardware. The type and/or number of hardware included in the vehicle control device 101 is not limited to that shown in FIG. 1. For example, the vehicle control device 101 may include only some of hardware components shown in FIG. 1.

According to an embodiment, the steering wheel 103 may be operated by a driver to specify a driving direction of a host vehicle. The processor 105 of the vehicle control device 101 may control the driving status of the host vehicle based on the steering wheel 103. For example, the processor 105 of the vehicle control device 101 may obtain the driver's input to change the driving direction of the host vehicle through the steering wheel 103. The processor 105 of the vehicle control device 101 may change the driving direction of the host vehicle based on the driver's input to change the driving direction.

According to an embodiment, the processor 105 of the vehicle control device 101 may identify whether the host vehicle is under autonomous driving control. When a host vehicle having an existing vehicle control device is under autonomous driving, the driving direction of the host vehicle may not be controlled based on the driving direction of the host vehicle determined according to the amount of operation of the steering wheel 103 even though the driver operates the steering wheel 103. This is because, when the host vehicle is under autonomous driving control, an accident risk may be high when the driving direction is changed by operating the steering wheel. Further, this is because, when a host vehicle having an existing vehicle control device is under autonomous driving control, the steering wheel 103 may not be operated by the user's intention.

According to an embodiment, when the driver operates the steering wheel 103 to improve usability, the processor 105 of the vehicle control device 101 may switch control of driving of the host vehicle from the autonomous driving system to the driver according to the amount of operation of the steering wheel 103. The control of the operation of the host vehicle may include control of the driving direction of the host vehicle or control of the driving speed of the host vehicle.

However, when there is an accident risk, the processor 105 of the vehicle control device 101 according to an embodiment may not switch control of driving of the host vehicle from a system for performing autonomous driving to the driver even when the driver operates the steering wheel 103. The situation in which there is an accident risk may include a situation where the operation of the steering wheel 103 is not due to the user's intention or include a situation where there is a risk of overturning or collision due to a sudden change in direction.

Accordingly, the processor 105 of the vehicle control device 101 may determine whether a condition that the steering wheel is operated with an amount of operation greater than a threshold value and for a time greater than a threshold time value is satisfied, to determine whether an accident risk is less than a reference value. This is because torque may be applied to the steering wheel 103 due to friction between the front wheel and the ground according to the operation of the host vehicle.

The processor 105 of the vehicle control device 101 may identify whether a condition that the steering wheel 103 is operated with the amount of operation greater than the threshold value and for the time greater than the threshold time value is satisfied. Thus, the processor 105 of the vehicle control device 101 may identify whether the torque applied to the steering wheel 103 is caused by operation according to the driver's intention, rather than by friction between the front wheel and the ground.

According to an embodiment, the processor 105 of the vehicle control device 101 may change a threshold value and a threshold time value based on at least one of a strength with which the steering wheel 103 is gripped, a direction in which the driver's gaze is directed, whether a turn signal lamp is operated, the state of the host vehicle, or any combination thereof to determine whether the operation of the steering wheel 103 is due to the user's intention.

The threshold value and the threshold time value are described in detail below with reference to FIGS. 3, 4, and 5.

FIG. 2 is a block diagram specifically illustrating a configuration of a vehicle control device according to an embodiment of the present disclosure.

A vehicle control device 201 according to an embodiment of the present disclosure may be implemented inside or outside a vehicle. Some of components included in the vehicle control device 201 may be implemented inside or outside the vehicle.

Referring to FIG. 2, the vehicle control device 201 may include at least one of a steering information input device 203, a vehicle movement identification device 205, a driver gaze identification device 207, a steering-wheel grip identification device 209, a surrounding environment identification device 211, an autonomous driving system controller 213, a drive controller 215, or any combination thereof. At least one of the steering information input device 203, the vehicle movement identification device 205, the driver gaze identification device 207, the steering-wheel grip identification device 209, the surrounding environment identification device 211, the autonomous driving system controller 213, the drive controller 215, or any combination thereof may be electrically and/or operatively connected to each other by electronic components, such as a communication bus.

The type and/or number of hardware included in the vehicle control device 201 is not limited to that shown in FIG. 2. For example, the vehicle control device 201 may include only some of hardware components shown in FIG. 2.

According to an embodiment, the processor of the vehicle control device 201 may determine whether an accident risk is less than a reference value when the control of driving is switched from a system for performing autonomous driving to the driver. The determination is performed based on information identified by the steering information input device 203, the vehicle movement identification device 205, the driver gaze identification device 207, the steering-wheel grip identification device 209, and the surrounding environment identification device 211.

According to an embodiment, the vehicle control device 201 may switch the control of driving from the system for performing autonomous driving to the driver for driver convenience when an accident risk is less than the reference value even through the control of driving is switched. When the control of driving is switched to the driver, the drive controller 215 may control the driving direction of the host vehicle in a driving direction determined based on the amount of operation of the steering wheel.

According to an embodiment, the steering information input device 203 may identify the amount of operation of the steering wheel. For example, the steering information input device 203 may identify the amount of operation of the steering wheel through a torque sensor included in the steering wheel, but embodiments of the present disclosure may not be limited thereto. The amount of operation of the steering wheel may be determined based on a torque or a force applied to the steering wheel.

According to an embodiment, the vehicle movement identification device 205 may identify the speed, deceleration, and acceleration of the host vehicle.

According to an embodiment, the driver gaze identification device 207 may determine the direction in which the driver's gaze is directed, through a camera for acquiring an image including the driver. For example, the driver gaze identification device 207 may determine a point on the windshield of the host vehicle at which the driver's gaze is directed, through the camera. The driver gaze identification device 207 may determine whether the driver's gaze is directed toward the front of the host vehicle based on determining that the point is included in a specified area on the windshield. For example, the driver gaze identification device 207 may determine whether the driver's gaze is directed to the right side of the host vehicle based on determining that the driver's gaze is directed to an area including a right side mirror, through the camera. For example, the driver gaze identification device 207 may determine whether the driver's gaze is directed to the left side of the host vehicle based on determining that the driver's gaze is directed to an area including a left side mirror, through the camera.

According to an embodiment, the steering-wheel grip identification device 209 may identify the driver's steering wheel grip state. For example, the steering-wheel grip identification device 209 may identify a strength with which the steering wheel is gripped. For example, the steering-wheel grip identification device 209 may determine whether the steering wheel is gripped by one hand, both hands, or not gripped. The steering-wheel grip identification device 209 may identify a strength with which the steering wheel is gripped through a touch sensor included in the steering wheel. The touch sensor may include a hydrostatic sensor or a capacitive sensor.

According to an embodiment, the surrounding environment identification device 211 may identify the location or speed of an external object. For example, the surrounding environment identification device 211 may identify the location and speed of a surrounding vehicle.

According to an embodiment, the autonomous driving system controller 213 may determine the driving speed or driving direction of the host vehicle based on the location or speed of an external object obtained from the surrounding environment identification device 211. According to an embodiment, the autonomous driving system controller 213 may determine a deceleration of the host vehicle based on the location or speed of an external object obtained from the surrounding environment identification device 211. The autonomous driving system controller 213 may transmit setting values required for driving to the drive controller 215 based on information necessary for driving, such as the surrounding environment, legal conditions, and road conditions.

According to an embodiment, the drive controller 215 may operate the host vehicle based on a drive command received from the autonomous driving system controller 213.

FIG. 3 shows an example of a graph showing the relationship between decelerations and thresholds in a vehicle control device or vehicle control method according to an embodiment of the present disclosure.

Referring to FIG. 3, a first graph 301 may represent accelerations of a host vehicle over time. The first graph 301 may determine a point 303 indicating the maximum deceleration value among the decelerations of the host vehicle measured during a specified time 305. A second graph 311 may represent a candidate value for a threshold value according to the maximum deceleration. A third graph 313 may represent a candidate value for a threshold time according to the maximum deceleration. The deceleration may include a deceleration of the host vehicle in the longitudinal direction.

According to an embodiment, the processor of the vehicle control device may identify the maximum deceleration value among the decelerations of the host vehicle measured during the specified time 305 (e.g., about 4 seconds). In the first graph 301, a vertical axis represents a longitudinal acceleration, which is the acceleration in the longitudinal direction. Therefore, the point of the minimum longitudinal acceleration may represent the maximum deceleration value.

The point 303 may include a point representing the largest deceleration among deceleration values identified during the time between a certain point in time (e.g., t_2) and a point in time before a specified time (e.g., t_1).

Because the torque applied to the steering wheel may vary due to the friction force of the front wheel according to the deceleration indicated by the point 303, the processor of the vehicle control device may switch control of driving of the host vehicle from the autonomous driving system to the driver to reduce an accident risk when the amount of the operation of the steering wheel that is equal to or greater than the threshold value is maintained for a threshold time value after the certain point in time (e.g., t_2).

According to an embodiment, the threshold value may be determined based on a candidate value for a threshold value and whether the driver's gaze is directed toward the front of the vehicle. The candidate value for the threshold value may be determined based on the maximum deceleration value among the decelerations of the host vehicle measured during a specified time and the strength with which the steering wheel is gripped. The candidate value for the threshold value may be a candidate value that may be the threshold value.

According to an embodiment, the threshold time value may be determined based on a candidate value for a threshold time and whether the driver's gaze is directed toward the front of the vehicle. The candidate value for the threshold time may be determined based on the maximum deceleration value among the decelerations of the host vehicle measured during a specified time and the strength with which the steering wheel is gripped. The candidate value for the threshold time may be a candidate value that may be the threshold time value.

According to an embodiment, when the driver's gaze is directed toward the front of the vehicle, the processor of the vehicle control device may determine the candidate value for a threshold value as the threshold value and may determine the candidate value for the threshold time as a threshold time value. When the driver's gaze is not directed toward the front of the vehicle, the processor of the vehicle control device may determine a greater value of the candidate value for the threshold value and a first specified value, which is a specified value, as the threshold value, and may determine a greater value of the candidate value for the threshold time and a first specified time value, which is a specified time value, as the threshold time value. The threshold value and the threshold time value, when the driver's gaze is not directed toward the front of the vehicle, may be set higher than the threshold value and the threshold time value, when the driver's gaze is directed toward the front of the vehicle. This is because the operation of the steering wheel may not be due to the user's intention.

In the second graph 311, the candidate value for the threshold value may be changed depending on the maximum deceleration value. According to an embodiment, the processor of the vehicle control device may determine a default threshold value as a first value based on the maximum deceleration value having the first value. The processor of the vehicle control device may determine the default threshold value as a second value larger than the first value based on the maximum deceleration value having the second value greater than the first value.

The processor of the vehicle control device may determine a candidate value for the threshold value based on a value obtained by multiplying a default threshold value determined based on the maximum deceleration value by an operation weight assigned based on the strength with which the steering wheel is gripped. A method of assigning an operation weight is described below with reference to FIG. 4.

In the third graph 313, the candidate value for the threshold time may be changed depending on the maximum deceleration value. According to an embodiment, the processor of the vehicle control device may determine a default threshold time value to be a third value based on a determination that the maximum deceleration value is a third value. The processor of the vehicle control device may determine the default threshold time value to be a fourth value larger than the third value based on the maximum deceleration value being the fourth value.

The processor of the vehicle control device may determine a candidate value for the threshold time based on the product of a default threshold time value determined based on the maximum deceleration value and a time weight assigned based on the strength with which the steering wheel is gripped. The method of assigning a time weight is described below with reference to FIG. 4.

FIG. 4 shows an example of a table showing the relationship between the gripping state of a steering wheel and weights in a vehicle control device or vehicle control method according to an embodiment of the present disclosure.

Referring to FIG. 4, a table 401 may represent operation weights and time weights according to a strength with which a steering wheel is gripped. The strength with which a steering wheel is gripped according to a first grip may be higher than a strength with which a steering wheel is gripped according to a second grip. A W1 value may be smaller than a W2 value. The W2 value may be smaller than a W3 value. The W1 value, W2 value, and W3 value may include values greater than 0 and less than or equal to 1. A W4 value may be smaller than a W5 value. The W5 value may be smaller than a W6 value. The W4 value, W5 value, and W6 value may include values greater than 0 and less than or equal to 1.

According to an embodiment, the processor of the vehicle control device may change the threshold value and the threshold time value based on the strength with which the steering wheel is gripped. This is because the greater the strength with which the steering wheel is gripped, the higher the probability that the operation of the steering wheel is in accordance with the user's intention.

According to an embodiment, the processor of the vehicle control device may determine a threshold value based on a value obtained by multiplying, by a default threshold value, an operation weight assigned according to the strength with which the steering wheel is gripped. According to an embodiment, the processor of the vehicle control device may determine a threshold time value based on a value obtained by multiplying, by a default threshold time value, a time weight assigned according to the strength with which the steering wheel is gripped.

According to an embodiment, the processor of the vehicle control device may assign a first operation weight (e.g., W1) based on a strength (e.g., a strength by first grip) with which the steering wheel is gripped. The strength satisfies a first range. The processor of the vehicle control device may assign a second operation weight (e.g., W2) greater than the first operation weight based on a strength (e.g., a strength by second grip) with which the steering wheel is gripped. The strength satisfies a second range. The strength with which the steering wheel is gripped and which is included in the first range (e.g., the strength by the first grip) may be greater than the strength with which the steering wheel is gripped and which is included in the second range (e.g., the strength by the second grip). The second range may also include a case of not gripping a steering wheel, where the strength with which the steering wheel is gripped is 0.

According to an embodiment, the processor of the vehicle control device may assign a first time weight (e.g., W4) based on the strength, with which the steering wheel is gripped. The strength satisfies a third range. The processor of the vehicle control device may assign a second time weight (e.g., W5) that is greater than the first time weight (e.g., W4) based on the strength, with which the steering wheel is gripped. The strength satisfies a fourth range. The strength with which the steering wheel is gripped and which is included in the third range (e.g., the strength by the first grip) may be greater than the strength with which the steering wheel is gripped and which is included in the fourth range (e.g., the strength by the second grip). The fourth range may also include a case of not gripping a steering wheel, where the strength with which the steering wheel is gripped is 0.

Although the candidate value for the threshold time is described as being changed depending on a deceleration in FIGS. 3 and 4, embodiments of the present disclosure may not be limited thereto.

According to an embodiment, the candidate value for the threshold value may be changed depending on the deceleration, and the candidate value for the threshold time may be a constant value.

For example, the processor of the vehicle control device may determine the candidate value for the threshold value according to a value obtained by multiplying the maximum deceleration value among the decelerations of the host vehicle measured during a specified time by an operation weight given based on the strength with which the steering wheel is gripped. The candidate value for the threshold time may be determined to be a constant value, regardless of the maximum deceleration value and the strength with which the steering wheel is gripped.

Figure 5:
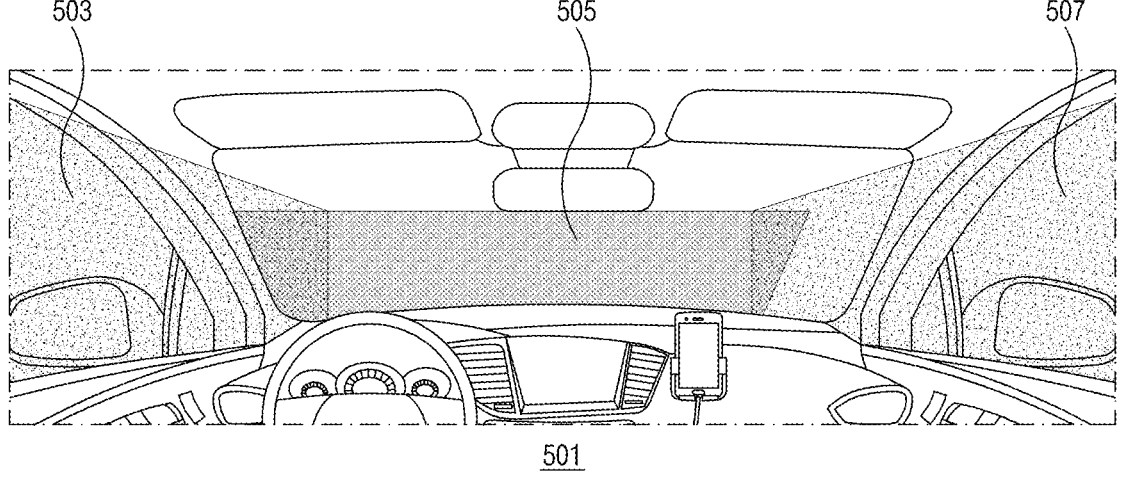
FIG. 5 shows an example of an area for determining the direction of a driver's gaze in a vehicle control device or a vehicle control method according to an embodiment of the present disclosure.

FIG. 5 shows an example of an area for determining the direction of a driver's gaze in a vehicle control device or a vehicle control method according to an embodiment of the present disclosure.

Referring to FIG. 5, an area 501 of the host vehicle may include a first area 503, a second area 505, and a third area 507. A case where the driver's gaze is identified in the first area 503 may include a case where the driver's gaze is directed toward the left side of the vehicle. A case where the driver's gaze is identified in the second area 505 may include a case where the driver's gaze is directed toward the front of the vehicle. A case where the driver's gaze is identified in the third area 507 may include the case where the driver's gaze is directed toward the right side of the vehicle.

The first area 503 may include a left side mirror. The second area 505 may include a specified area on the windshield of the host vehicle. The third area 507 may include a right side mirror.

According to an embodiment, the processor of the vehicle control device may determine a threshold value based on a candidate value for a threshold value and based on the direction in which the driver's gaze is directed. The processor of the vehicle control device may determine a threshold time value based on a candidate value for a threshold time and based on the direction in which the driver's gaze is directed. Because the method of determining a candidate value for the threshold value and a candidate value for the threshold time are described with reference to FIGS. 3 and 4, duplicated description has been omitted below.

According to an embodiment, when the driver's gaze is identified in the second area 505, the processor of the vehicle control device may determine the candidate value for a threshold value as the threshold value and may determine the candidate value for the threshold time as a threshold time value.

According to an embodiment, when the driver's gaze is not identified in the second area 505, the processor of the vehicle control device may determine a greater value of a candidate value for the threshold value and a first specified value, which is the specified value, as the threshold value. When the driver's gaze is not identified in the second area 505, the processor of the vehicle control device may determine a greater value of a candidate value for the threshold time and a first specified time value, which is the specified time value, as the threshold time value.

This is because a probability that the steering wheel has been operated according to the user's intention when the driver's gaze is identified in the second area 505 is high compared to a probability that the steering wheel has been operated according to the user's intention when the driver's gaze is not identified in the second area 505. A vehicle control device according to an embodiment may reduce an accident risk by switching control of the operation of the host vehicle from a system for performing autonomous driving to the driver due to operation of the steering wheel according to the user's intention.

According to an embodiment, when the driver's gaze is identified in the first area 503 and a left turn signal lamp is activated although the driver's gaze is not identified in the second area 505, the candidate value for the threshold value may be determined as the threshold value, and the candidate value for the threshold time may be determined as the threshold time value as in the case where the driver's gaze is identified in the second area 505.

Also, when the driver's gaze is identified in the third area 507 and a right turn signal lamp is activated although the driver's gaze is not identified in the second area 505, the candidate value for the threshold value may be determined as the threshold value, and the candidate value for the threshold time may be determined as the threshold time value as in the case where the driver's gaze is identified in the second area 505.

This is because the operation of the steering wheel may be due to the user's intention when the driver activates the right turn signal lamp and the driver's gaze is directed toward the right side of the host vehicle, or when the driver activates the left turn signal lamp and the driver's gaze is directed toward the left side of the host vehicle although the driver's gaze is not directed toward the front of the host vehicle.

According to an embodiment, the processor of the vehicle control device may consider the state of the host vehicle as well as the direction of the driver's gaze to determine whether the operation of the steering wheel is due to the user's intention.

The state of the host vehicle may be determined based on whether a steering operation is required. For example, the processor of the vehicle control device may determine a threshold parameter value (e.g., a threshold value, or a threshold time value) when the host vehicle is in a state in which there is a need to switch control of the operation of the host vehicle to the driver as being lower than a threshold parameter value when the host vehicle is in a state in which it is unnecessary to switch control of the operation of the host vehicle to the driver.

For example, the processor of the vehicle control device may determine a threshold value in correspondence with a candidate value for the threshold value and in correspondence with a value obtained by multiplying the value determined based on whether the driver's gaze is directed toward the front of the vehicle by a specified state weight, based on a determination that that the host vehicle is in a specified state.

For example, the processor of the vehicle control device may determine a threshold time value in correspondence with a candidate value for the threshold time, and in correspondence with a value obtained by multiplying the value determined based on whether the driver's gaze is directed toward the front of the vehicle by a state weight identical to or different from the state weight, based on a determination that the host vehicle is in the specified state. When there is a need to switch control of the operation of the host vehicle to the driver, the state weight may be included in a range of 0 or more and less than 1 to lower the threshold value and threshold time value.

The specified state may include a state in which there is a need to switch control of the operation of the host vehicle to the driver. According to an embodiment, the state in which there is a need to switch control of the operation of the host vehicle to the driver may include a state of the host vehicle when an emergency vehicle (e.g., police car, ambulance, or fire truck) is identified behind the host vehicle, a construction zone is identified in front of the host vehicle, or it is difficult to maintain the host vehicle's lane.

Although it is described in FIG. 5 that the threshold value is determined based on the maximum deceleration value among the decelerations of the host vehicle measured during a specified time, and the threshold time value is determined based on the maximum deceleration value, embodiments of the present disclosure are not limited thereto.

According to an embodiment, the processor of the vehicle control device may determine at least one of a threshold value, a threshold time value, or any combination thereof based on a specific deceleration value of the host vehicle at a specific point in time, instead of the maximum deceleration.

For example, when the driver's gaze is directed toward the front of the vehicle, the processor of the vehicle control device may determine, as the threshold value, a value determined based on at least one of a specific deceleration value of the host vehicle at a specific point in time, the strength with which the steering wheel is gripped, or any combination thereof. For example, when the driver's gaze is directed toward the front of the vehicle, the processor of the vehicle control device may determine, as the threshold time value, a time value determined based on at least one of the specific deceleration value, the strength with which the steering wheel is gripped, or any combination thereof.

For example, when the driver's gaze is not directed toward the front of the vehicle, the processor of the vehicle control device may determine, as the threshold value, a greater value of the value determined based on at least one of a specific deceleration value of the host vehicle at a specific point in time, the strength with which the steering wheel is gripped, or any combination thereof, and a second specified value, which is a specified value. For example, when the driver's gaze is not directed toward the front of the vehicle, the processor of the vehicle control device may determine, as the threshold time value, a greater value of a time value determined based on at least one of the specific deceleration value of the host vehicle, the strength with which the steering wheel is gripped, or any combination thereof, and a second specified time value, which is a specified time value.

FIG. 6 shows a flowchart of operation of a vehicle control device for switching control of driving from a system for performing autonomous driving to a driver based on a threshold value according to an operation weight and a threshold time value according to a time weight in a vehicle control device or a vehicle control method according to an embodiment of the present disclosure.

Hereinafter, it is assumed that the vehicle control device 101 of FIG. 1 performs the process of FIG. 6. Additionally, in the description of FIG. 6, operations described as being performed by the vehicle control device may be understood as being controlled by the processor 105 of the vehicle control device 101.

Referring to FIG. 6, in a first operation 601, the processor of the vehicle control device may determine a default threshold value and a default threshold time value corresponding to a deceleration value. According to an embodiment, the deceleration value may include the maximum deceleration value among decelerations of the host vehicle measured during a specified time or may include a specific deceleration value of the host vehicle at a specific point in time.

In a second operation 603, the processor of the vehicle control device may determine a candidate value for the threshold value and a candidate value for the threshold time based on an operation weight and a time weight according to the strength with which the steering wheel is gripped.

According to one embodiment, the processor of the vehicle control device may determine a candidate value for the threshold value based on a value obtained by multiplying a default threshold value determined based on a deceleration value by an operation weight determined based on the strength with which the steering wheel is gripped.

According to an embodiment, the processor of the vehicle control device may determine a candidate value for the threshold time based on a value obtained by multiplying a default threshold time value determined based on the deceleration value by a time weight assigned based on the strength with which the steering wheel is gripped.

In a third operation 605, the processor of the vehicle control device may determine a threshold value and a threshold time value according to the driver's gaze, whether the turn signal lamp is operated, and whether the host vehicle is in a specified state.

According to an embodiment, when the driver's gaze is directed toward the front of the vehicle, the processor of the vehicle control device may determine the candidate value for a threshold value as the threshold value and may determine the candidate value for the threshold time as a threshold time value.

According to an embodiment, when the driver's gaze is not directed toward the front of the vehicle, the processor of the vehicle control device may determine a greater value of the candidate value for the threshold value and the first specified value, which is the specified value, as the threshold value. When the driver's gaze is not directed toward the front of the vehicle, the processor of the vehicle control device may determine a greater value of a candidate value for the threshold time and a first specified time value, which is the specified time value, as the threshold time value.

According to an embodiment, when the driver's gaze is directed toward the left side of the host vehicle and the left turn signal lamp is activated, or when the driver's gaze is directed toward the right side of the host vehicle and the right turn signal lamp is activated even though the driver's gaze is not directed toward the front of the host vehicle, the candidate value for the threshold value may be determined as a threshold value, and the candidate value for the threshold time may be determined as a threshold time value, as in the case where the driver's gaze is directed toward the front of the host vehicle.

According to an embodiment, the processor of the vehicle control device may determine a threshold parameter value (e.g., a threshold value, or a threshold time value) when the host vehicle is in a state in which it is necessary to switch control of the operation of the host vehicle to the driver as being lower than a threshold parameter value when the host vehicle is in a state in which there is no need to switch control of the operation of the host vehicle to the driver.

For example, the processor of the vehicle control device may determine a threshold value in correspondence with a candidate value for the threshold value and in correspondence with a value obtained by multiplying the value determined based on whether the driver's gaze is directed toward the front of the vehicle by a specified state weight, based on a determination that the host vehicle is in a specified state. The specified state may include a state in which there is a need to change control of the operation of the host vehicle to the driver. The state in which there is a need to switch control of the operation of the host vehicle to the driver may include a state of the host vehicle when an emergency vehicle (e.g., police car, ambulance, or fire truck) is identified behind the host vehicle, a construction zone is identified in front of the host vehicle, or it is difficult to maintain the host vehicle's lane For example, the processor of the vehicle control device may determine a threshold time value in correspondence with a candidate value for the threshold time and in correspondence with a value obtained by multiplying the value determined based on whether the driver's gaze is directed toward the front of the vehicle by a state weight identical to or different from the state weight, based on a determination that the host vehicle is in the specified state. When it is necessary to switch control of the operation of the host vehicle to the driver, the state weight may be included in a range of 0 or more and less than 1 to lower the threshold value and threshold time value.

In a fourth operation 607, the processor of the vehicle control device may determine whether the steering wheel is operated with an amount of operation that is greater than the threshold value. When the steering wheel is operated with the amount of operation that is greater than the threshold value (Yes in 607), the processor of the vehicle control device may perform a fifth operation 609. When the steering wheel is not operated with the amount of operation that is greater than the threshold value (No in 607), the processor of the vehicle control device may perform a sixth operation 615.

According to an embodiment, the processor of the vehicle control device may perform the fourth operation 607 and the fifth operation 609 to determine whether an accident risk is less than a reference value. A situation in which an accident risk is higher than a reference value may include a situation in which the operation of the steering wheel is not caused by the user's intention.

In the fifth operation 609, the processor of the vehicle control device may determine whether the steering wheel is operated for a time greater than the threshold time value. When the steering wheel is operated for the time greater than the threshold time value (Yes in 609), the processor of the vehicle control device may perform a seventh operation 611. When the steering wheel is not operated for the time greater than the threshold time value (No in 609), the processor of the vehicle control device may perform an eighth operation 613.

In the seventh operation 611, the processor of the vehicle control device may perform control by the driver. In other words, the processor of the vehicle control device may switch control of the operation of the host vehicle from a system for performing autonomous driving to the driver.

In the eighth operation 613, the processor of the vehicle control device may determine whether the operation state of the steering wheel is maintained. When the operation state of the steering wheel is maintained (Yes in 613), the processor of the vehicle control device may perform the fifth operation 609. When the operation state of the steering wheel is not maintained (No in 613), the processor of the vehicle control device may perform the sixth operation 615.

According to an embodiment, the reason for this is that a condition that the steering wheel is operated for a time that is greater than the threshold time value may be satisfied as the time has elapsed when the steering wheel is maintained in the operation state.

In the sixth operation 615, the processor of the vehicle control device may perform control by the system. In other words, the processor of the vehicle control device may maintain control of the operation of the host vehicle given to the autonomous driving system and may not allow the driver to take over control of the operation of the host vehicle.

Figure 7:
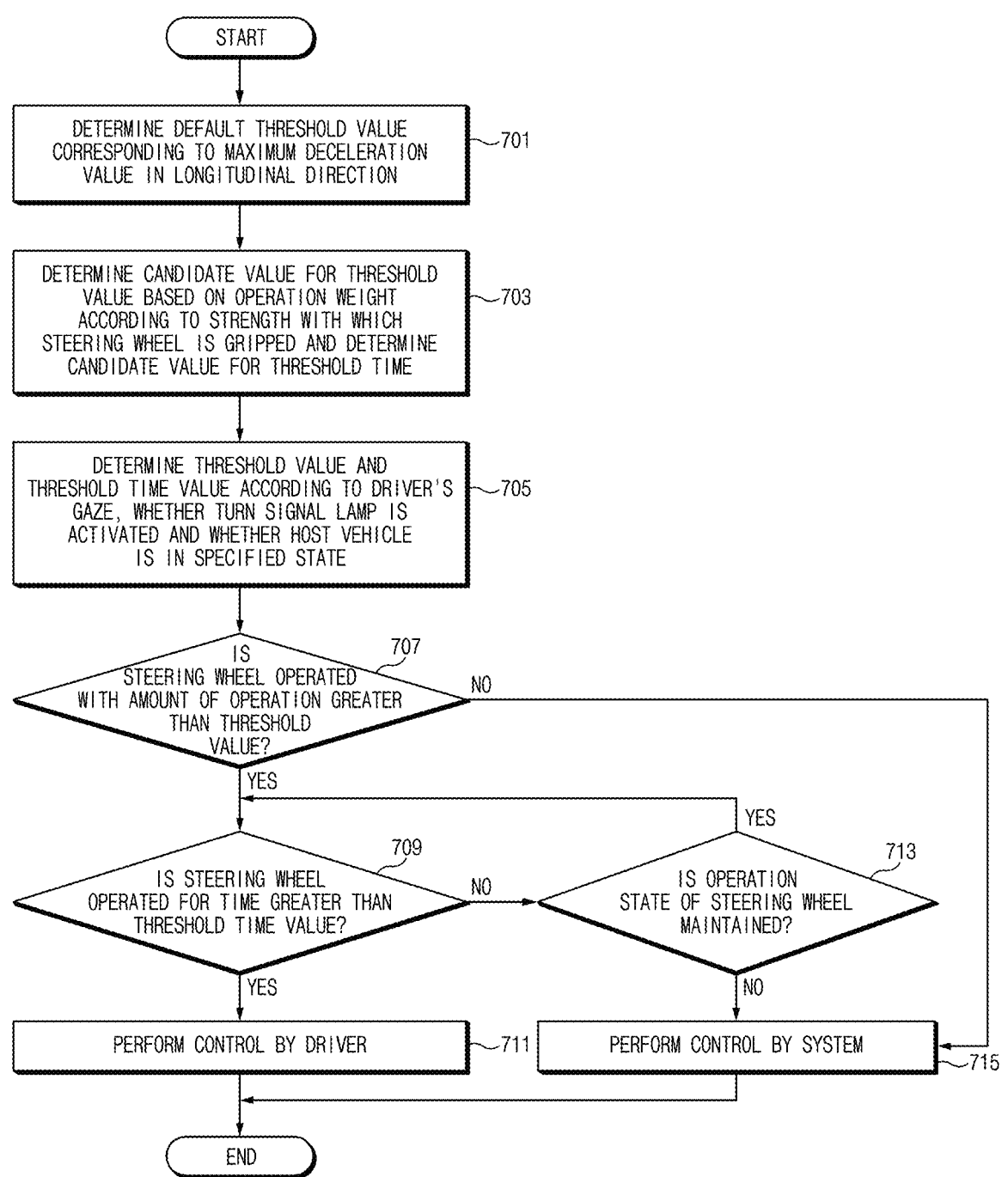
FIG. 7 shows a flowchart of operation of a vehicle control device for switching control of driving from a system for performing autonomous driving to a driver based on a threshold value according to an operation weight and a threshold time value in a vehicle control device or a vehicle control method according to an embodiment of the present disclosure.

FIG. 7 shows a flowchart of operation of a vehicle control device for switching control of driving from a system for performing autonomous driving to a driver based on a threshold value according to an operation weight and a threshold time value in a vehicle control device or a vehicle control method according to an embodiment of the present disclosure.

Hereinafter, it is assumed that the vehicle control device 101 of FIG. 1 performs the process of FIG. 7. Additionally, in the description of FIG. 7, operations described as being performed by the vehicle control device may be understood as being controlled by the processor 105 of the vehicle control device 101.

Referring to FIG. 7, in a first operation 701, the processor of the vehicle control device may determine a default threshold value corresponding to the maximum deceleration value of the host vehicle in the longitudinal direction. According to an embodiment, the maximum deceleration value may include the maximum deceleration value among the decelerations of the host vehicle measured during a specified time.

In a second operation 703, the processor of the vehicle control device may determine a candidate value for a threshold value based on an operation weight according to a strength with which the steering wheel is gripped and may determine a candidate value for a threshold time.

According to an embodiment, the processor of the vehicle control device may determine a candidate value for the threshold value based on a value obtained by multiplying a default threshold value determined based on the maximum deceleration value by an operation weight assigned based on the strength with which the steering wheel is gripped. It should be noted that the candidate value for the threshold time may be a constant value regardless of the strength with which the steering wheel is gripped.

In a third operation 705, the processor of the vehicle control device may determine a threshold value and a threshold time value according to the driver's gaze, whether the turn signal lamp is operated, and whether the host vehicle is in a specified state.

According to an embodiment, when the driver's gaze is directed toward the front of the vehicle, the processor of the vehicle control device may determine the candidate value for a threshold value as the threshold value and may determine the candidate value for the threshold time as a threshold time value.

According to an embodiment, when the driver's gaze is not directed toward the front of the vehicle, the processor of the vehicle control device may determine a greater value of the candidate value for the threshold value and the first specified value, which is the specified value, as the threshold value. When the driver's gaze is not directed toward the front of the vehicle, the processor of the vehicle control device may determine a greater value of a candidate value for the threshold time and a first specified time value, which is the specified time value, as the threshold time value.

According to an embodiment, when the driver's gaze is directed toward the left side of the host vehicle and the left turn signal lamp is activated, or when the driver's gaze is directed toward the right side of the host vehicle and the right turn signal lamp is activated even though the driver's gaze is not directed toward the front of the host vehicle, the candidate value for the threshold value may be determined as a threshold value, and the candidate value for the threshold time may be determined as a threshold time value, as in the case where the driver's gaze is directed toward the front of the host vehicle.

In a fourth operation 707, the processor of the vehicle control device may determine whether the steering wheel is operated with an amount of operation that is greater than the threshold value. When the steering wheel is operated with the amount of operation that is greater than the threshold value (Yes in 707), the processor of the vehicle control device may perform a fifth operation 709. When the steering wheel is not operated with the amount of operation that is greater than the threshold value (No in 707), the processor of the vehicle control device may perform a sixth operation 715.

In the fifth operation 709, the processor of the vehicle control device may determine whether the steering wheel is operated for a time greater than the threshold time value. When the steering wheel is operated for the time greater than the threshold time value (Yes in 709), the processor of the vehicle control device may perform a seventh operation 711. When the steering wheel is not operated for the time greater than the threshold time value (No in 709), the processor of the vehicle control device may perform an eighth operation 713.

In a seventh operation 711, the processor of the vehicle control device may perform control by the driver. In other words, the processor of the vehicle control device may switch control of the operation of the host vehicle from a system for performing autonomous driving to the driver.

In the eighth operation 713, the processor of the vehicle control device may determine whether the operation state of the steering wheel is maintained. When the operation state of the steering wheel is maintained (Yes in 713), the processor of the vehicle control device may perform the fifth operation 709. When the operation state of the steering wheel is not maintained (No in 713), the processor of the vehicle control device may perform the sixth operation 715.

According to an embodiment, the reason for this is that a condition that the steering wheel is operated for a time that is greater than the threshold time value may be satisfied as the time has elapsed when the steering wheel is maintained in the operation state.

In the sixth operation 715, the processor of the vehicle control device may perform control by the system. In other words, the processor of the vehicle control device may maintain control of the operation of the host vehicle given to the autonomous driving system and may not allow the driver to take over control of the operation of the host vehicle.

FIG. 8 shows a flowchart of operation of a vehicle control device for switching control of driving from a system for performing autonomous driving to a driver based on a threshold value and a threshold time value according to a driver's gaze in a vehicle control device or a vehicle control method according to an embodiment of the present disclosure.

Hereinafter, it is assumed that the vehicle control device 101 of FIG. 1 performs the process of FIG. 8. Additionally, in the description of FIG. 8, operations described as being performed by the vehicle control device may be understood as being controlled by the processor 105 of the vehicle control device 101.

Referring to FIG. 8, in a first operation 801, the processor of the vehicle control device may determine that the host vehicle is under autonomous driving control.

In a second operation 803, the processor of the vehicle control device may determine a threshold value or a threshold time value based on at least one of the maximum, deceleration value, a strength with which the steering wheel is gripped, whether a driver's gaze is directed toward the front of a host vehicle, or any combination thereof.

According to an embodiment, the processor of the vehicle control device may determine a candidate value for a threshold value or a candidate value for a threshold time based on at least one of a maximum deceleration value among decelerations of the host vehicle measured during a specified time, a strength with which the steering wheel is gripped, or any combination thereof. The processor of the vehicle control device may determine a threshold value or a threshold time value based on the candidate value for the threshold value, the candidate value for the threshold time, whether a driver's gaze is directed toward front of the host vehicle, or any combination thereof.

According to an embodiment, the candidate value for the threshold value may be determined based on at least one of the maximum deceleration value among the decelerations of the host vehicle measured during a specified time, the strength with which the steering wheel is held, or any combination thereof. According to an embodiment, the candidate value for the threshold time may be determined based on at least one of the maximum deceleration value, the strength with which the steering wheel is gripped, or any combination thereof.

In a third operation 805, the processor of the vehicle control device may switch control of driving of the host vehicle from a system for performing autonomous deriving to the driver based on the steering wheel being operated with an amount of operation greater than the threshold value and for a time greater than the threshold time value.

According to the processor of the vehicle control device may control the host vehicle based on the driver's operation.

Figure 9:
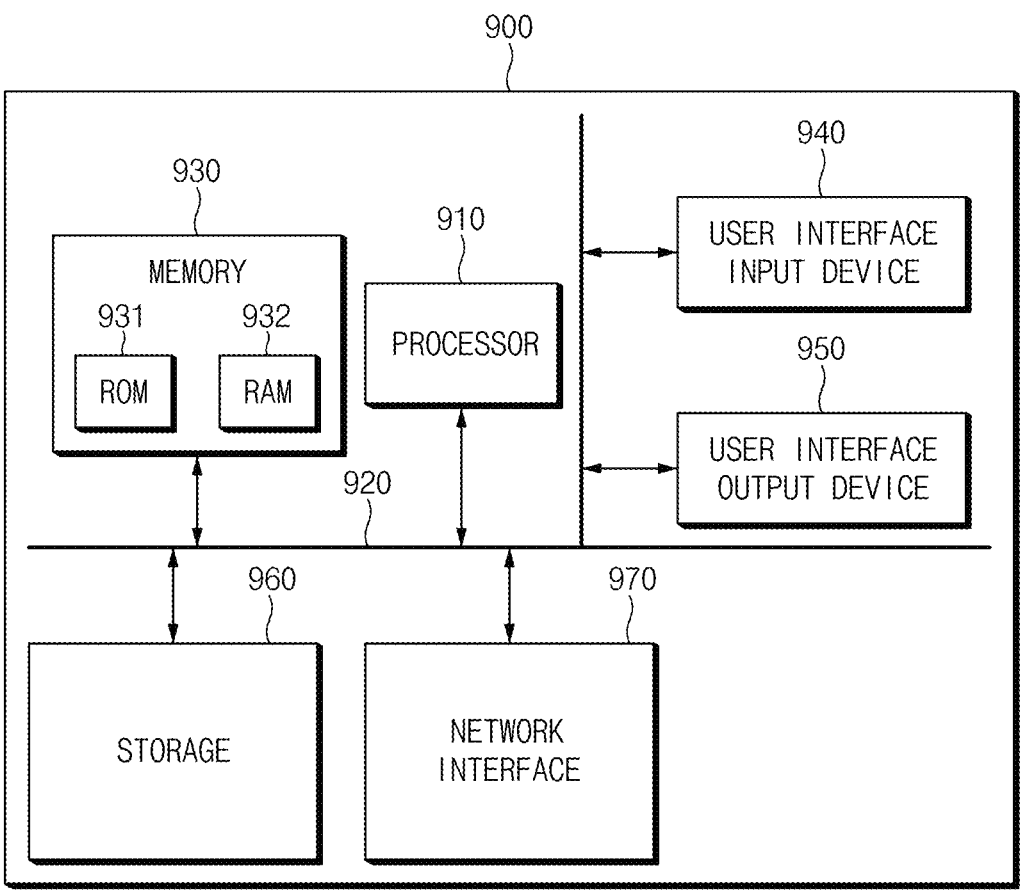
FIG. 9 shows a computing system related to a vehicle control device or a vehicle control method according to an embodiment of the present disclosure.

FIG. 9 shows a computing system related to a vehicle control device or a vehicle control method according to an embodiment of the present disclosure.

Referring to FIG. 9, a computing system 900 may include at least one processor 910, a memory 930, a user interface input device 940, a user interface output device 950, a storage 960, and a network interface 970, which are connected with each other via a bus 920.

The processor 910 may be a central processing unit (CPU) or a semiconductor device that processes instructions stored in the memory 930 and/or the storage 960. The memory 930 and the storage 960 may include various types of volatile or non-volatile storage media. For example, the memory 930 may include a ROM (Read Only Memory) 931 and a RAM (Random Access Memory) 932.

Thus, the operations of the method or the algorithm described in connection with the embodiments disclosed herein may be embodied directly in hardware or a software module executed by the processor 910, or in a combination thereof. The software module may reside on a storage medium (i.e., the memory 930 and/or the storage 960) such as a RAM, a flash memory, a ROM, an EPROM, an EEPROM, a register, a hard disk, a removable disk, and a CD-ROM.

The storage medium may be coupled to the processor 910, and the processor 910 may read information out of the storage medium and may record information in the storage medium. Alternatively, the storage medium may be integrated with the processor 910. The processor and the storage medium may reside in an application specific integrated circuit (ASIC). The ASIC may reside within a user terminal. In another case, the processor and the storage medium may reside in the user terminal as separate components.

The above description merely illustrates the technical idea of the present disclosure, and various modifications and variations may be made without departing from the essential characteristics of the present disclosure by those having ordinary skill in the art to which the present disclosure pertains.

Accordingly, the embodiment disclosed in the present disclosure is not intended to limit the technical idea of the present disclosure but to describe the present disclosure, and the scope of the technical idea of the present disclosure is not limited by the embodiment. The scope of protection of the present disclosure should be interpreted according to the following claims, and all technical ideas within the scope equivalent thereto should be construed as being included in the scope of the present disclosure.

The present technology may determine whether the operation of the steering wheel is caused by a driver's intention based on the driver's gaze under autonomous driving control.

The present technology may whether the operation of the steering wheel is caused by a driver's intention based on the driver's gaze and whether a turn signal lamp is operating under autonomous driving control.

The present technology may allow a driver to take over control of driving when there is a specified state in which it is necessary to change control of driving of a host vehicle under autonomous driving control from a system for performing autonomous driving to a driver.

Further, the present technology may reduce an accident risk due to operation of a steering wheel under autonomous driving control.

In addition, various effects may be provided that are directly or indirectly understood through the disclosure.

Hereinabove, although the present disclosure has been described with reference to embodiments and the accompanying drawings, the present disclosure is not limited thereto but may be variously modified and altered by those having ordinary skill in the art to which the present disclosure pertains without departing from the spirit and scope of the present disclosure claimed in the following claims.

What is claimed is:

1. A vehicle control device comprising:
a steering wheel configured to specify a driving direction of a host vehicle; and
a processor,
wherein the processor is configured to
determine that the host vehicle is under autonomous driving control,
determine a candidate value for a threshold value or a candidate value for a threshold time based on at least one of a maximum deceleration value among decelerations of the host vehicle measured during a specified time, a strength with which the steering wheel is gripped, or any combination thereof, determine a threshold value or a threshold time value based on the candidate value for the threshold value, the candidate value for the threshold time, whether a gaze of a driver is directed toward front of the host vehicle, or any combination thereof,
switch control of driving of the host vehicle from a system for performing autonomous driving to the driver based on the steering wheel being operated with an amount of operation greater than the threshold value and for a time greater than the threshold time value, and
control the host vehicle based on an operation of the driver.

2. The vehicle control device of claim 1, wherein the processor is configured to:
determine the candidate value for the threshold value as the threshold value and determine the candidate value for the threshold time as the threshold time value when the gaze of the driver is directed toward the front of the host vehicle; and
determine, as the threshold value, a greater value of the candidate value for the threshold value and a first specified value, which is a specified value and determine, as the threshold time value, a greater value of the candidate value for the threshold time and a first specified time value, which is a specified time value, when the gaze of the driver is not directed toward the front of the host vehicle.

3. The vehicle control device of claim 1, wherein the processor is configured to:
determine, as the threshold value, a value determined based on at least one of a specific deceleration value of the host vehicle at a specific point in time, the strength with which the steering wheel is gripped, or any combination thereof when the gaze of the driver is directed toward the front of the host vehicle;
determine, as the threshold time value, a time value determined based on at least one of the specific deceleration value, the strength with which the steering wheel is gripped, or any combination thereof when the gaze of the driver is directed toward the front of the host vehicle;
determine, as the threshold value, a greater value of the value and a second specified value, which is a specified value, when the gaze of the driver is not directed toward the front of the host vehicle; and
determine, as the threshold time value, a greater value of the time value and a second specified time value, which is a specified time value, when the gaze of the driver is not directed toward the front of the host vehicle.

4. The vehicle control device of claim 3, wherein the processor is configured to:
determine the candidate value for the threshold value as the threshold value and the candidate value for the threshold time as the threshold time value when a right turn signal lamp is activated and the gaze of the driver is directed toward a right side of the host vehicle, or when a left turn signal lamp is activated and the gaze of the driver is directed toward a left side of the host vehicle, even though the gaze of the driver is not directed toward the front of the host vehicle.

5. The vehicle control device of claim 1, wherein the processor is configured to:
determine, based on a determination that the host vehicle is in a specified state, the threshold value in correspondence with a value obtained by multiplying, by a specified state weight, a value determined based on the candidate value for the threshold value and whether the gaze of the driver is directed toward the front of the host vehicle; and determine, based on a determination that the host vehicle is in the specified state, the threshold time value in correspondence with a value obtained by multiplying, by a state weight identical to or different from the specified state weight, the value determined based on the candidate value for the threshold time and whether the gaze of the driver is directed toward the front of the host vehicle, wherein the specified state includes a state in which there is a need to switch control of driving of the host vehicle from the system for performing the autonomous driving to the driver.

6. The vehicle control device of claim 1, further comprising:

a camera configured to acquire an image including the driver, wherein the processor is configured to determine a point to which the gaze of the driver is directed on a windshield of the host vehicle through the camera, and determine whether the gaze of the driver is directed toward the front of the host vehicle based on a determination that the point is included within a specified area on the windshield.

7. The vehicle control device of claim 1, wherein the processor is configured to:

determine a default threshold value based on the maximum deceleration value;

assign an operation weight based on the strength with which the steering wheel is gripped; and determine the candidate value for the threshold value based on a value obtained by multiplying the default threshold value by the operation weight.

8. The vehicle control device of claim 1, wherein the processor is configured to:

determine a default threshold time value based on the maximum deceleration value;

assign a time weight based on the strength with which the steering wheel is gripped; and determine the candidate value for the threshold time based on a value obtained by multiplying the default threshold time value by the time weight.

9. The vehicle control device of claim 6, wherein the processor is configured to:

determine whether the gaze of the driver is directed to a right side of the host vehicle based on a determination that the gaze of the driver is directed toward an area including a right-side mirror through the camera; and determine whether the gaze of the driver is directed toward a left side of the host vehicle based on a determination that the gaze of the driver is directed toward an area including a left side mirror through the camera.

10. The vehicle control device of claim 2, wherein the processor is configured to:

determine a default threshold value based on the maximum deceleration value;

assign an operation weight based on the strength with which the steering wheel is gripped; and determine the candidate value for the threshold value based on a value obtained by multiplying the default threshold value by the operation weight.

11. A vehicle control method comprising:

determining that a host vehicle is under autonomous driving control;

determining a candidate value for a threshold value or a candidate value for a threshold time based on at least one of a maximum deceleration value among decelerations of the host vehicle measured during a specified time, a strength with which a steering wheel is gripped, or any combination thereof;

determining a threshold value or a threshold time value based on the candidate value for the threshold value, the candidate value for the threshold time, whether a gaze of a driver is directed toward front of the host vehicle, or any combination thereof;

switching control of driving of the host vehicle from a system for performing autonomous driving to the driver based on the steering wheel being operated with an amount of operation greater than the threshold value and for a time greater than the threshold time value; and controlling the host vehicle based on an operation of the driver.

12. The vehicle control method of claim 11, wherein determining the threshold value or the threshold time value includes:

determining the candidate value for the threshold value as the threshold value when the gaze of the driver is directed toward the front of the host vehicle;

determining, as the threshold value, a greater value of the candidate value for the threshold value and a first specified value, which is a specified value, when the gaze of the driver is not directed toward the front of the host vehicle;

determining the candidate value for the threshold time as the threshold time value when the gaze of the driver is directed toward the front of the host vehicle; and determining, as the threshold time value, a greater value of the candidate value for the threshold time and a first specified time value, which is a specified time value, when the gaze of the driver is not directed toward the front of the host vehicle.

13. The vehicle control method of claim 11, wherein determining the threshold value or the threshold time value includes:

determining, as the threshold value, a value determined based on at least one of a specific deceleration value of the host vehicle at a specific point in time, the strength with which the steering wheel is gripped, or any combination thereof when the gaze of the driver is directed toward the front of the host vehicle;

determining, as the threshold value, a greater value of the value and a second specified value, which is a specified value, when the gaze of the driver is not directed toward the front of the host vehicle;

determining, as the threshold time value, a time value determined based on at least one of the specific deceleration value, the strength with which the steering wheel is gripped, or any combination thereof when the gaze of the driver is directed toward the front of the host vehicle; and determining, as the threshold time value, a greater value of the time value and a second specified time value, which is a specified time value, when the gaze of the driver is not directed toward the front of the host vehicle.

14. The vehicle control method of claim 13, wherein determining the threshold value or the threshold time value includes:

determining the candidate value for the threshold value as the threshold value, even though the gaze of the driver is not directed toward the front of the host vehicle when the gaze of the driver is directed toward a right side of the host vehicle and a right turn signal lamp is activated, or when the gaze of the driver is directed toward a left side of the host vehicle and a left turn signal lamp is activated; and determining the candidate value for the threshold time as the threshold time value, even though the gaze of the driver is not directed toward the front of the host vehicle, when the gaze of the driver is directed toward the right side of the host vehicle and the right turn signal lamp is activated, or when the gaze of the driver is directed toward the left side of the host vehicle and the left turn signal lamp is activated.

15. The vehicle control method of claim 11, further comprising:

determining, based on a determination that the host vehicle is in a specified state, the threshold value in correspondence with a value obtained by multiplying, by a specified state weight, a value determined based on the candidate value for the threshold value and whether the gaze of the driver is directed toward the front of the host vehicle; and determining, based on a determination that the host vehicle is in the specified state, the threshold time value in correspondence with a value obtained by multiplying, by a state weight identical to or different from the state weight, the value determined based on the candidate value for the threshold time and whether the gaze of the driver is directed toward the front of the host vehicle, wherein the specified state includes a state in which there is a need to switch control of driving of the host vehicle from the system for performing the autonomous driving to the driver.

16. The vehicle control method of claim 11, further comprising:

determining a point to which the gaze of the driver is directed on a windshield of the host vehicle through a camera for acquiring an image including the driver; and determining whether the gaze of the driver is directed toward the front of the host vehicle based on determining that the point is included within a specified area on the windshield.

17. The vehicle control method of claim 11, wherein determining the candidate value for the threshold value or the candidate value for the threshold time includes:

determining a default threshold value based on the maximum deceleration value;

assigning an operation weight based on the strength with which the steering wheel is gripped; and determining the candidate value for the threshold value based on a value obtained by multiplying the default threshold value by the operation weight.

18. The vehicle control method of claim 11, wherein determining the candidate value for the threshold value or the candidate value for the threshold time includes:

determining a default threshold time value based on the maximum deceleration value;

assigning a time weight based on the strength with which the steering wheel is gripped; and determining the candidate value for the threshold time based on a value obtained by multiplying the default threshold time value by the time weight.

19. The vehicle control method of claim 16, further comprising:

determining whether the gaze of the driver is directed to a right side of the host vehicle based on a determination that the gaze of the driver is directed toward an area including a right side mirror through the camera; and determining whether the gaze of the driver is directed toward a left side of the host vehicle based on a determination that the gaze of the driver is directed toward an area including a left side mirror through the camera.

20. The vehicle control method of claim 12, wherein determining the candidate value for the threshold value or the candidate value for the threshold time includes:

determining a default threshold value based on the maximum deceleration value;

assigning an operation weight based on the strength with which the steering wheel is gripped; and determining the candidate value for the threshold value based on a value obtained by multiplying the default threshold value by the operation weight.

* * * * *